United States Patent [19]
Krause

[11] Patent Number: 5,477,814
[45] Date of Patent: Dec. 26, 1995

[54] TRACK SYSTEM WITH EXERCISE BALL

[75] Inventor: Robert C. Krause, Arlington Heights, Ill.

[73] Assignee: Pets International, Ltd., Arlington Heights, Ill.

[21] Appl. No.: 384,810

[22] Filed: Feb. 6, 1995

Related U.S. Application Data

[63] Continuation of Ser. No. 191,516, Feb. 3, 1994, abandoned.

[51] Int. Cl.⁶ .................................................. A01K 15/00
[52] U.S. Cl. ........................................... 119/702; 446/444
[58] Field of Search ................................. 119/15.1, 700, 119/702, 703, 704; 446/168, 170, 444

[56] References Cited

U.S. PATENT DOCUMENTS

| | | | |
|---|---|---|---|
| 2,227,241 | 12/1940 | Bonnett et al. | 446/444 X |
| 2,992,598 | 7/1961 | Einfalt | 446/444 |
| 3,587,190 | 6/1971 | Ashton | 446/168 |
| 3,768,810 | 10/1973 | Goldfarb et al. | 446/168 X |
| 4,142,724 | 3/1979 | Reick | 446/170 X |
| 5,074,465 | 12/1991 | Nepper | 446/444 X |

FOREIGN PATENT DOCUMENTS 431111 7/1935 Germany ............................. 446/444

Primary Examiner—Gene Mancene
Assistant Examiner—Thomas Rice
Attorney, Agent, or Firm—Douglas B. White

[57] ABSTRACT

An effective track system for guiding a rolling hamster ball includes straight and curved track sections, placed end to end. Each track section has a base and paired support rails protruding upwardly from the base for supporting and guiding the pet exercising ball along the track.

4 Claims, 1 Drawing Sheet

TRACK SYSTEM WITH EXERCISE BALL

This is a continuation of application Ser. No. 08/191,516 filed on Feb. 3, 1994 now abandoned.

BACKGROUND OF THE INVENTION

This invention relates generally to pet toys and more particularly to pet exercising products, such as the popular clear plastic ball used to contain and exercise hamsters. These balls securely enclose the pet, and by use of a running movement, the pet causes the ball to roll. Currently, no system has been devised to contain or control these hamster balls.

SUMMARY OF THE INVENTION

It is accordingly the object of the present invention to provide an effective track system for guiding a rolling hamster ball. This object is accomplished by forming straight and curved track sections which may be placed end to end to form the track system. Each section comprises a base portion and paired support rails protruding upwardly from said base portion, for supporting and guiding the pet exercising ball along the track. Each rail is formed by the convergence of a pair of support legs.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 2:
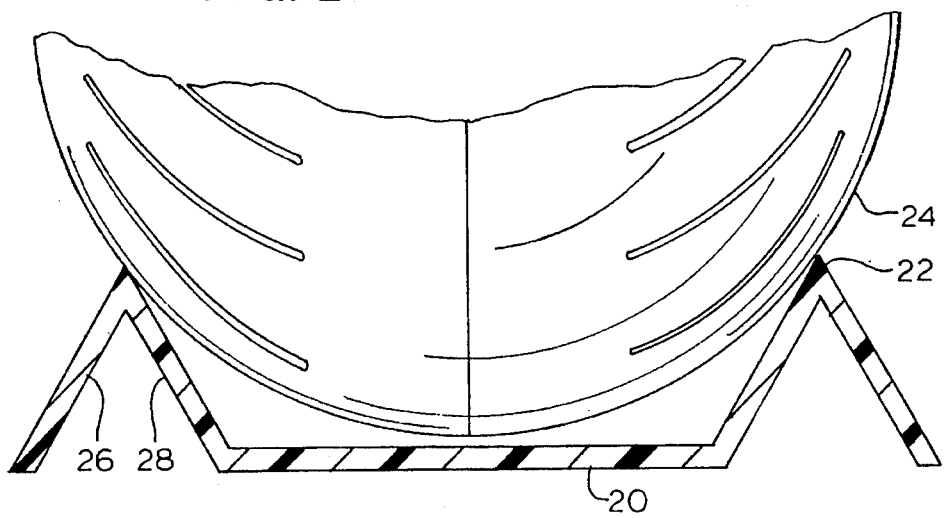
FIG. 2 is a cross section of the track of FIG. 1 showing the positioning of the pet exercising ball thereon.
Figure 1:
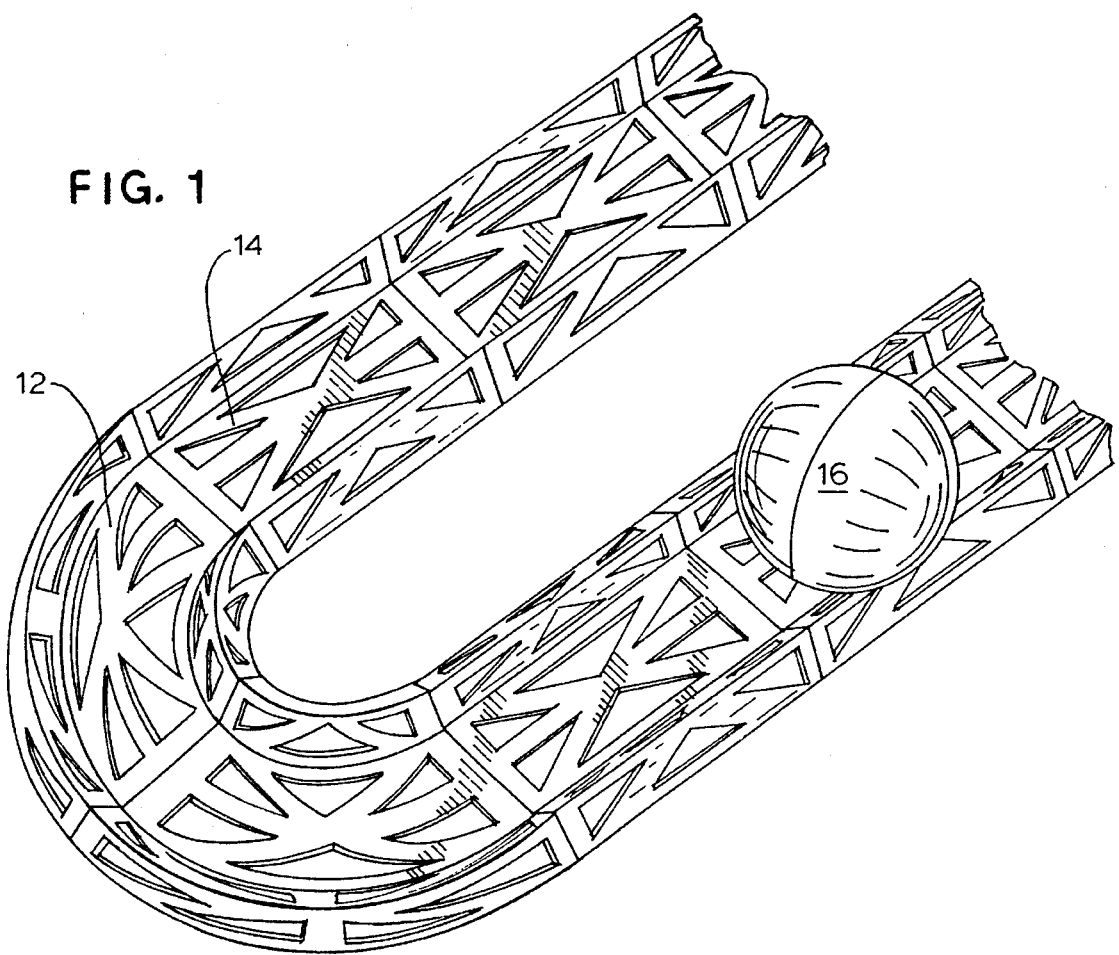
FIG. 1 is a pictorial view of a track system in accordance with the present invention.

Turning to the drawings, FIG. 1 depicts a typical track system composed of curved track sections 12 and straight track sections 14 placed end to end to provide continuous support for a ball 16. This ball 16 is of the type well known in the pet industry which contains and encloses a pet, such as a hamster, and which allows the pet to exercise therein, thereby causing the ball to move. As shown in detail in FIG. 2, a track section consists of a base 20 and rails 22 attached to the base and positioned thereby to contact and support the surface 24 of the ball. In the preferred embodiment, these rails comprise an edge formed at the conjunction of converging support legs 26 and 28. Also, as clearly shown in FIG. 2, the rails are separated by a distance less than the diameter of the ball to support the ball above the base 20 and provide clearance between the ball and the base.

From the foregoing description, it will be apparent that modifications can be made to the apparatus and method for using same without departing from the teachings of the present invention. Accordingly, the scope of the invention is only to be limited as necessitated by the accompanying claims.

I claim:

1. Pet exercise apparatus comprising:

a track supporting and guiding a pet exercise ball along said track, said track having a base and means for supporting and guiding said ball above said base, said means comprising paired support rails spaced from said base and dual pairs of converging supporting legs, each respective pair being joined to respective opposing sides of said base and forming a supporting edge in each support rail, wherein said ball rests on said support rails and wherein each of said support rails are supported by said respective pair of converging supporting legs.

2. The pet exercise apparatus of claim 1 wherein said support rails are spaced apart by a distance less than the diameter of said ball.

3. The pet exercise apparatus of claim 2 wherein said support legs elevate said ball above said base, providing clearance between the surface of said ball and said base of said track.

4. The pet exercise apparatus of claim 3 wherein each of said paired supporting legs converge to form an edge and each support rail comprises said edge formed by said convergence of said pair of supporting legs.

* * * * *